US009129401B2

(12) United States Patent
Yamanaka

(10) Patent No.: US 9,129,401 B2
(45) Date of Patent: Sep. 8, 2015

(54) IMAGE PROCESSING APPARATUS, IMAGING APPARATUS, AND IMAGE PROCESSING METHOD, CONFIGURED TO PROCESS REDUCED-SIZE IMAGES

(75) Inventor: Yuji Yamanaka, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 150 days.

(21) Appl. No.: 13/605,932

(22) Filed: Sep. 6, 2012

(65) Prior Publication Data
US 2013/0063625 A1    Mar. 14, 2013

(30) Foreign Application Priority Data

Sep. 14, 2011  (JP) ................................. 2011-200874

(51) Int. Cl.
*G06T 7/20* (2006.01)
*G06K 9/36* (2006.01)
*G06T 5/00* (2006.01)
*H04N 5/232* (2006.01)
*H04N 5/262* (2006.01)

(52) U.S. Cl.
CPC ................ *G06T 7/2053* (2013.01); *G06K 9/36* (2013.01); *G06T 5/003* (2013.01); *G06T 7/2006* (2013.01); *H04N 5/23254* (2013.01); *H04N 5/23267* (2013.01); *G06T 2207/20201* (2013.01); *H04N 5/2625* (2013.01)

(58) Field of Classification Search
None
See application file for complete search history.

(56) References Cited

U.S. PATENT DOCUMENTS

| 6,999,103 | B2 * | 2/2006 | Matsumoto et al. | 345/620 |
| 2004/0125115 | A1 * | 7/2004 | Takeshima et al. | 345/634 |
| 2008/0094481 | A1 * | 4/2008 | Rai | 348/222.1 |
| 2009/0201382 | A1 * | 8/2009 | Makino | 348/220.1 |
| 2009/0208062 | A1 * | 8/2009 | Sorek et al. | 382/107 |
| 2009/0231465 | A1 * | 9/2009 | Senba | 348/229.1 |
| 2009/0245685 | A1 * | 10/2009 | Makii | 382/276 |
| 2010/0128138 | A1 * | 5/2010 | Nitta et al. | 348/222.1 |
| 2010/0157085 | A1 * | 6/2010 | Sasaki | 348/222.1 |
| 2010/0172641 | A1 * | 7/2010 | Sasaki et al. | 396/265 |

(Continued)

FOREIGN PATENT DOCUMENTS

| JP | 2004-334818 | 11/2004 |
| JP | 3793258 | 4/2006 |

(Continued)

OTHER PUBLICATIONS

Jun. 2, 2015 Japanese official action in corresponding Japanese Patent Application No. 2011-200874.

*Primary Examiner* — Dennis Hogue
(74) *Attorney, Agent, or Firm* — Cooper & Dunham LLP

(57) ABSTRACT

An image processing apparatus includes a size reducing unit that reduces sizes of a plurality of continuous images, which are still images obtained by continuously capturing images of a moving object, to thereby generate reduced continuous images; a mask generating unit that extracts moving object regions from the reduced continuous images, to thereby generate reduced moving object extraction mask images; a size restoring unit that enlarges the reduced moving object extraction mask images to the same size as original sizes of the continuous images that are not reduced by the size reducing unit, to thereby generate moving object extraction mask images; and a combining unit that extracts the moving object regions from the continuous images by using the moving object extraction mask images to thereby obtain moving object images, and combines the moving object images in a predetermined one of the continuous images.

12 Claims, 21 Drawing Sheets

(56) References Cited

U.S. PATENT DOCUMENTS

| | | | |
|---|---|---|---|
| 2011/0025885 A1* | 2/2011 | Minami | 348/231.3 |
| 2011/0043639 A1* | 2/2011 | Yokohata | 348/169 |
| 2012/0014576 A1* | 1/2012 | Olson et al. | 382/128 |
| 2012/0105657 A1* | 5/2012 | Yokohata et al. | 348/208.4 |
| 2012/0162473 A1* | 6/2012 | Cheng | 348/231.99 |
| 2012/0242779 A1* | 9/2012 | Liu et al. | 348/36 |
| 2012/0242853 A1* | 9/2012 | Jasinski et al. | 348/222.1 |
| 2012/0243802 A1* | 9/2012 | Fintel et al. | 382/284 |
| 2012/0257071 A1* | 10/2012 | Prentice | 348/220.1 |

FOREIGN PATENT DOCUMENTS

| | | |
|---|---|---|
| JP | 2008-198082 | 8/2008 |
| JP | 2009-135670 | 6/2009 |
| JP | 2011-097217 | 5/2011 |
| JP | 2012-73997 | 4/2012 |

\* cited by examiner

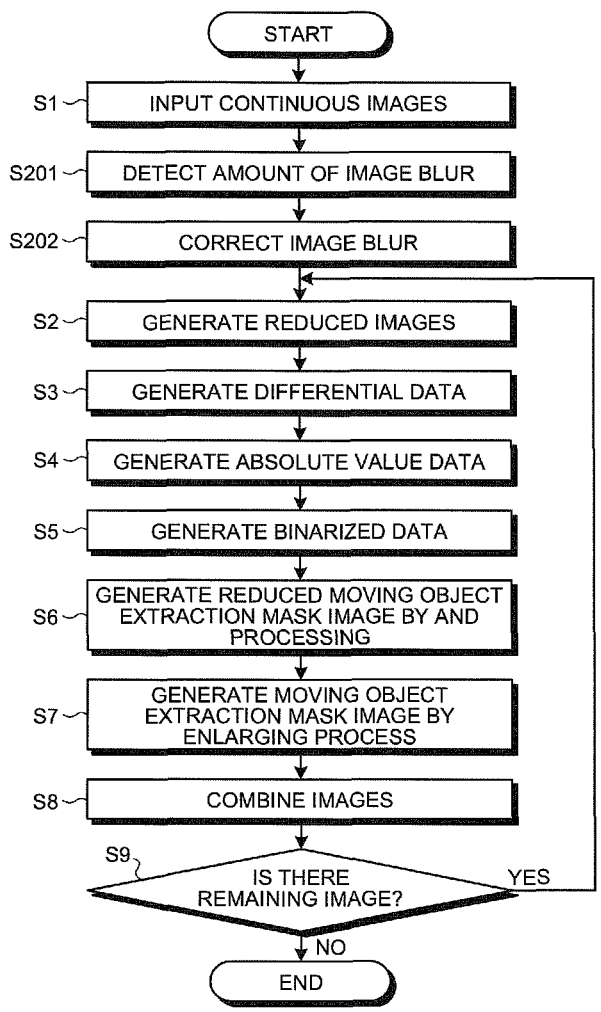

IMAGE PROCESSING APPARATUS, IMAGING APPARATUS, AND IMAGE PROCESSING METHOD, CONFIGURED TO PROCESS REDUCED-SIZE IMAGES

CROSS-REFERENCE TO RELATED APPLICATIONS

The present application claims priority to and incorporates by reference the entire contents of Japanese Patent Application No. 2011-200874 filed in Japan on Sep. 14, 2011.

BACKGROUND OF THE INVENTION

1. Field of the Invention

The present invention relates to an image processing apparatus, an imaging apparatus, and an image processing method.

2. Description of the Related Art

Conventionally, there is a known image processing apparatus that generates what is called a stroboscopic motion image, in which a plurality of images of an object in motion (hereinafter, described as a "moving object") that are continuously captured by the imaging apparatus are combined in one image with a background so that the movement of the moving object can be seen at one view.

In general, the stroboscopic motion image is generated such that an image processing apparatus separates regions containing a moving object (hereinafter, described as "moving object regions") from the rest region (hereinafter, described as a "background region") and a plurality of images of the moving object regions are combined in one image containing the background region. The image processing apparatus of this type calculates differences between continuous images to separate between the moving object regions and the background regions to thereby separate the moving object regions from the background regions.

Furthermore, for example, there is a known image processing apparatus that uses the magnitude of a motion vector to separate between the moving object regions and the background regions (see, for example, Japanese Patent No. 3793258). The image processing apparatus eliminates background regions with motion vectors of small magnitudes, thereby extracting moving object regions with motion vectors of large magnitudes.

Therefore, even when the background regions contain an object, such as an audience or a tree in the outside, that does not stand still but moves slightly and intricately, it becomes possible to accurately extract the moving object regions by extracting the moving object regions containing a relatively large motion.

However, in the image processing apparatus as described above, a difference in the magnitude between the motion vectors is used to distinguish between the moving object regions and the background regions. Therefore, an extremely large number of calculation processes are needed to calculate the motion vectors. Consequently, processing time increases.

Furthermore, for example, if the image processing apparatus is mounted on a popular compact digital still camera (hereinafter, described as a "digital camera"), it takes even several tens of seconds to generate only one stroboscopic motion image, which is not appropriate for practical use.

Besides, when an image is captured by the digital camera held by hand, image blur may occur due to hand motion (camera shake) during image shooting. When the image blur occurs, the moving object regions and the background regions cannot completely be separated, and a part of the background regions may overlap the moving object regions resulting in an unnatural stroboscopic motion image.

Therefore, there is a need for an image processing apparatus, an imaging apparatus, and an image processing method capable of separating moving object regions from background regions simply and highly accurately to form one composite image even when continuous images contain image blur or the like due to hand motion (camera shake) during image shooting.

SUMMARY OF THE INVENTION

According to an embodiment, there is provided an image processing apparatus includes a size reducing unit that reduces sizes of a plurality of continuous images, which are still images obtained by continuously capturing images of a moving object, to thereby generate reduced continuous images; a mask generating unit that extracts moving object regions from the reduced continuous images, to thereby generate reduced moving object extraction mask images; a size restoring unit that enlarges the reduced moving object extraction mask images to the same size as original sizes of the continuous images that are not reduced by the size reducing unit, to thereby generate moving object extraction mask images; and a combining unit that extracts the moving object regions from the continuous images by using the moving object extraction mask images to thereby obtain moving object images, and combines the moving object images in a predetermined one of the continuous images.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 7 is a flowchart illustrating the flow of a process performed by the image processing unit of the imaging apparatus according to the second embodiment of the present invention;

DETAILED DESCRIPTION OF THE PREFERRED EMBODIMENTS

Exemplary embodiments of the present invention will be explained in detail below with reference to the accompanying drawings.

First Embodiment

First, an imaging apparatus including an image processing apparatus according to a first embodiment of the present invention will be explained below. In the first embodiment, the image processing apparatus is included in a compact digital still camera 1 as one example of the imaging apparatus.

Figure 1:
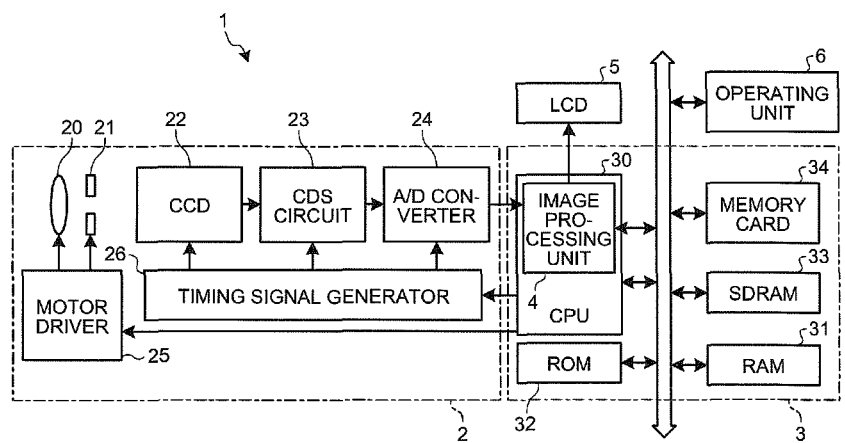
FIG. 1 is a schematic block diagram of an entire imaging apparatus according to a first embodiment of the present invention.

As illustrated in FIG. 1, the digital camera 1 includes an imaging unit 2, a control unit 3, an image processing unit 4 as one example of the image processing apparatus, an image output unit 5, and an operating unit 6.

The imaging unit 2 includes an imaging optical system 20, a mechanical shutter 21, an imaging element 22, a correlated double sampling (CDS) circuit 23, an analog-to-digital converter (hereinafter, described as "A/D converter") 24, a motor driver 25, and a timing signal generator 26. The imaging unit 2 continuously captures images of a moving object to generate continuous images formed of a plurality of still images.

The imaging optical system 20 includes, for example, a plurality of optical lens groups. Optical images of an object are incident on the imaging optical system 20 and focused onto the imaging element 22. The mechanical shutter 21 includes, for example, a lens shutter, and can block incident light entering the imaging element 22 via the imaging optical system 20. The imaging element 22 includes, for example, a charge coupled device (CCD). The imaging element 22 has an imaging surface and converts the optical images of an object focused on the imaging surface into analog image signals.

The CDS circuit 23 removes a noise component from the analog image signals output by the imaging element 22. The A/D converter 24 converts the analog image signals output by the CDS circuit 23 into digital image signals (hereinafter, described as "image data").

The motor driver 25 drives the imaging optical system 20 and the mechanical shutter 21 based on an instruction issued by the control unit 3 to thereby change the position of the imaging optical system 20 or open and close the mechanical shutter 21. The timing signal generator 26 generates a timing signal for driving the imaging element 22, the CDS circuit 23, or the A/D converter 24 at a predetermined timing based on an instruction issued by the control unit 3.

The control unit 3 includes a central processing unit (CPU) 30, a random access memory (RAM) 31 for temporarily storing data, a read only memory (ROM) 32 for storing fixed data, a synchronous dynamic random access memory (SDRAM) 33, and a memory card 34.

The ROM 32 stores therein a program for causing the digital camera 1 to capture a stroboscopic motion image. The CPU 30 executes the program stored in the ROM 32 by using the RAM 31 as a work area to thereby cause the compact digital camera 1 to capture a stroboscopic motion image as will be described later.

The image processing unit 4 is connected to the A/D converter 24, performs image processing on image data of continuous images output by the A/D converter 24, and output the processed image data.

Figure 2:
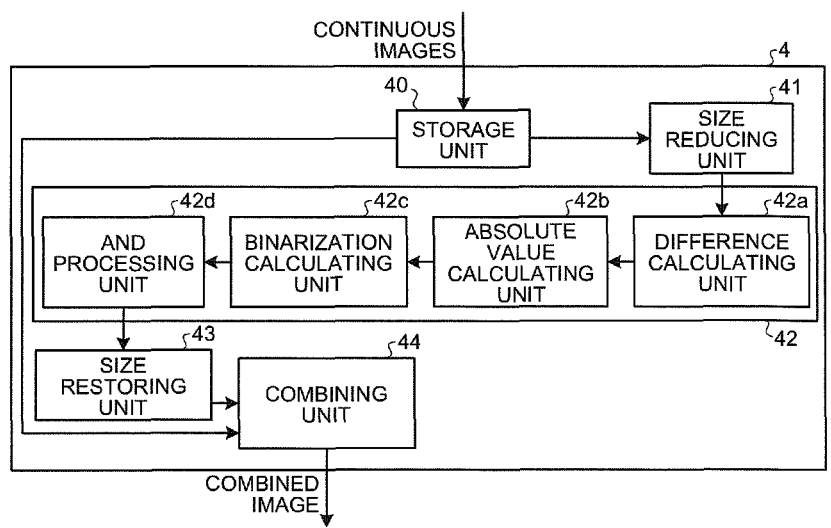
FIG. 2 is a schematic block diagram of an image processing unit of the imaging apparatus according to the first embodiment of the present invention.

As illustrated in FIG. 2, the image processing unit 4 includes a storage unit 40, a size reducing unit 41, a mask generating unit 42, a size restoring unit 43, and a combining unit 44.

The storage unit 40 is connected to the A/D converter 24 and stores the image data of the continuous images output by the A/D converter 24. The size reducing unit 41 is connected to the storage unit 40 and reduces the sizes of the continuous images, which are a plurality of continuously-captured still images of a moving object that are output by the storage unit 40, to thereby form reduced continuous images.

The mask generating unit 42 includes a difference calculating unit 42a, an absolute value calculating unit 42b, a binarization calculating unit 42c, and an AND processing unit 42d. The mask generating unit 42 is connected to the size reducing unit 41 and extracts moving object regions from a plurality of the reduced continuous images output by the size reducing unit 41 to thereby form reduced moving object extraction mask images.

The difference calculating unit 42a is connected to the size reducing unit 41 and performs differential processing on luminance by comparing two of the reduced continuous images output by the size reducing unit 41 to thereby obtain pieces of differential data. The absolute value calculating unit 42b is connected to the difference calculating unit 42a and calculates absolute values of the pieces of the differential data output by the difference calculating unit 42a to thereby obtain pieces of absolute value data.

The binarization calculating unit 42c is connected to the absolute value calculating unit 42b and performs binarization processing on the pieces of the absolute value data output by the absolute value calculating unit 42b to thereby obtain pieces of binarized data. The AND processing unit 42d is connected to the binarization calculating unit 42c and performs AND processing on the pieces of the binarized data output by the binarization calculating unit 42c to thereby obtain the reduced moving object extraction mask images.

The size restoring unit 43 is connected to the mask generating unit 42 and enlarges the reduced moving object extraction mask images output by the mask generating unit 42 to restore the sizes of the mask images to the sizes of the continuous images that are not reduced by the size reducing unit 41, to thereby generate moving object extraction mask images.

The combining unit 44 is connected to the size restoring unit 43 and the storage unit 40. The combining unit 44 extracts moving object images from corresponding continuous images output by the storage unit 40 by using the moving object extraction mask images output by the size restoring unit 43. The combining unit 44 combines a plurality of the extracted moving object images in one of the continuous images to thereby generate a stroboscopic motion image.

In the first embodiment, the combining unit 44 obtains a current stroboscopic motion image by using the moving object extraction mask images output by the size restoring unit 43, each corresponding continuous image output by the storage unit 40, and a previous stroboscopic motion image generated immediately before the current process. That is, the combining unit 44 extracts a moving object image by using a moving object extraction mask image and a corresponding continuous image, and combines the obtained moving object image in the previous stroboscopic motion image that is generated immediately before the current process. By extracting a moving object from each of the continuous images and sequentially combining the moving objects in one image, the stroboscopic motion image is generated.

As illustrated in FIG. 1, the image output unit 5 includes a liquid crystal display (LCD). The image output unit 5 is connected to the control unit 3. Display of the image output unit 5 is controlled by the control unit 3.

The operating unit 6 includes a switch, a lever, a touch panel, or the like for receiving operations input by a user.

The flow of an image processing method performed by the digital camera 1 according to the first embodiment will be explained below with reference to a flowchart in FIG. 3. The image processing method includes a size reducing step, a mask generating step, a size restoring step, and an image combining step.

At the size reducing step, continuous images, which are a plurality of still images that are obtained by continuously capturing images of a moving object, are reduced in size to generate reduced continuous images. At the mask generating step, moving object regions are extracted from a plurality of the reduced continuous images to generate reduced moving object extraction mask images. At the size restoring step, the reduced moving object extraction mask images are enlarged such that the sizes of the mask images are restored to the sizes that are not reduced by the size reducing unit 41, so that moving object extraction mask images are generated. At the image combining step, the moving object regions are extracted from the continuous images by using the moving object extraction mask images, and the moving object images are combined in a predetermined one of the continuous images.

The imaging unit 2 continuously captures images of an object including a moving object (see FIGS. 4A to 4E). The obtained images are sequentially input from the imaging unit 2 to the image processing unit 4 (Step S1). The storage unit 40 stores therein continuous images output by the imaging unit 2. For example, the storage unit 40 stores therein three continuous images (an image $I_A$, an image $I_B$, and an image $I_C$) illustrated in FIGS. 4A to 4C.

The size reducing unit 41 receives the continuous images output by the storage unit 40 and performs reduction processing on each of the input images (Step S2), which is an example of the size reducing step. As a method used in the reduction process, a method for simply reducing the number of pixels, a nearest neighbor interpolation method, a bilinear interpolation method, or the like may be used appropriately. In the example using the three continuous images described above (the image $I_A$, the image $I_B$, and the image $I_C$), it is assumed that the size reducing unit 41 reduces each of the images in size to obtain three reduced continuous images (an image $i_A$, an image $i_B$, and an image $i_C$).

By reducing the images, the area of the object displayed in each of the pixels is increased. Therefore, deviation in the images caused by noise or image blur due to hand motion (camera shake) can be cancelled out even by slightly reducing the sizes of the images. Furthermore, the degree to which the deviation due to the noise or the image blur is cancelled out increases along with an increase in the degree of reduction of the images. However, if the degree of reduction of the images is too large, an appropriate mask image cannot be obtained.

Therefore, it is preferable to appropriately set the degree of reduction of the images depending on the degree of image blur or the number of pixels in original images. For example, when an original image has about 3600×2700 pixels and the degree of image blur is within a normal range, it is preferable to reduce the image to approximately one eighth to one thirty-second per one side of the continuous image. It is more preferable to reduce the image to one sixteenth per one side of the continuous image. However, the embodiment is not limited to the above value range.

The difference calculating unit 42a obtains luminance differential data of the reduced continuous images output by the size reducing unit 41 (Step S3). For example, in the case of the three reduced continuous images (the image $i_A$, the image $i_B$, and the image $i_C$) described above, luminance differential data $d_{AB}$ between the image $i_A$ and the image $i_B$ and luminance differential data $d_{CB}$ between the image $i_C$ and the image $i_B$ are calculated.

Calculation expressions for calculating the differential data based on the luminance of each of the images are as follows for example:

$$d_{AB}(x, y) = i_A(x, y) - i_B(x, y)$$

$$d_{CB}(x, y) = i_C(x, y) - i_B(x, y)$$

where (x, y) are coordinates in the reduced continuous images.

The absolute value calculating unit 42b obtains an absolute value of each piece of the differential data output by the difference calculating unit 42a (Step S4). For example, absolute value data $e_{AB}$ and absolute value data $e_{CB}$ are calculated for the differential data $d_{AB}$ and the differential data $d_{CB}$, respectively.

Calculation expressions for calculating the absolute value from each piece of the differential data are as follows for example:

$$e_{AB}(x, y) = |d_{AB}(x, y)|$$

$$e_{CB}(x, y) = |d_{CB}(x, y)|$$

The binarization calculating unit 42c performs binarization processing on the absolute value data output by the absolute value calculating unit 42b to thereby obtain binarized data (Step S5). For example, the binarization processing is performed on the absolute value data $e_{AB}$ and the absolute value data $e_{CB}$ to obtain binarized data $f_{AB}$ and binarized data $f_{CB}$, respectively.

In the binarization processing, for example, a threshold T is set in advance and expressions below are used.

$$f_{AB}(x, y) = 0 \text{ (when } e_{AB}(x, y) < T\text{)}$$

$$f_{AB}(x, y) = 1 \text{ (when } e_{AB}(x, y) \geq T\text{)}$$

$$f_{CB}(x, y) = 0 \text{ (when } e_{CB}(x, y) < T\text{)}$$

$$f_{CB}(x, y) = 1 \text{ (when } e_{CB}(x, y) \geq T\text{)}$$

The AND processing unit 42d performs AND processing on the binarized data output by the binarization calculating unit 42c to obtain a reduced moving object extraction mask image (Step S6), which is an example of the mask generating step. The AND processing is performed by obtaining logical conjunction of the coordinates of two pieces of the binarized data. As a result, a reduced moving object extraction mask image $g_{ABC}$ is obtained.

The AND processing is performed on, for example, the binarized data $f_{AB}$ and the binarized data $f_{CB}$ by using expressions below.

$$g_{ABC}(x, y) = 1$$

(when both $f_{AB}(x, y)$ and $f_{CB}(x, y)$ are 1)

$$g_{ABC}(x, y) = 0$$

(when at least one of $f_{AB}(x, y)$ and $f_{CB}(x, y)$ is 0)

Figure 5A:
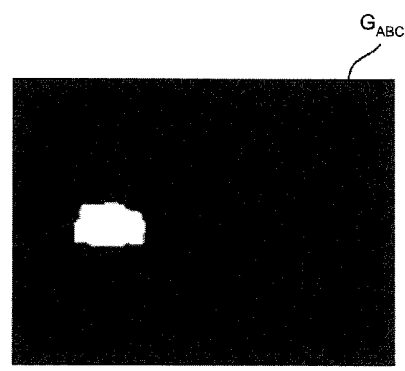
FIG. 5A illustrates a moving object extraction mask image generated by a mask generating unit according to an example, in which an image reducing process is performed before generation of the mask image and an image enlarging process is performed after generation of the mask image.

The size restoring unit 43 enlarges the reduced moving object extraction mask image $g_{ABC}$ output by the AND processing unit 42d to the same size as the continuous image to thereby obtain a moving object extraction mask image $G_{ABC}$ as illustrated in FIG. 5A (Step S7), which is an example of the size restoring step. As a method used to enlarge the image by the size restoring unit 43, a nearest neighbor interpolation method or a bilinear interpolation method, which is mentioned above in connection with the size reducing unit 41, may be used appropriately.

The combining unit 44 obtains a current stroboscopic image $S_n$ by using the moving object extraction mask image $G_{ABC}$ output by the size restoring unit 43, the image $I_B$ output from the storage unit 40, and a previous stroboscopic image $S_{n-1}$ generated immediately before this process (Step S8), which is an example of the image combining step.

A calculation expression is as follows.

$$S_n(x, y) = S_{n-1}(x, y) \times (1 - G_{ABC}(x, y)) + I_B(x, y) \times G_{ABC}(x, y)$$

The image $I_B$ output from the storage unit 40, which is used at the image combinating step by the combining unit 44, is not reduced or enlarged in size; therefore, the image $I_B$ itself is not degraded. When the previous stroboscopic image $S_{n-1}$ is not present in the case of the initial combining process, one arbitrary image is selected from the continuous images as a basis for the stroboscopic motion image and is used as the previous stroboscopic image $S_{n-1}$.

The CPU 30 determines whether there is a remaining continuous image which has not yet been combined (Step S9). When there is the remaining continuous image (YES at Step S9), the size reducing unit 41 performs the reduction processing on a next continuous image in order to generate a moving object extraction mask image to obtain a moving object image of the next continuous image (Step S2). On the other hand, when there is no remaining continuous image (NO at Step S9), the process ends.

As described above, the image processing unit 4 according to the first embodiment reduces the sizes of the continuous images $I_A$ to $I_C$ to obtain the reduced continuous images $i_A$ to $i_C$ before the mask generating unit 42 performs processing. Furthermore, the reduced moving object extraction mask image $g_{ABC}$ is enlarged and restored to the original size to obtain the moving object extraction mask image $G_{ABC}$ after the mask generating unit 42 completes the processing.

Figure 5B:
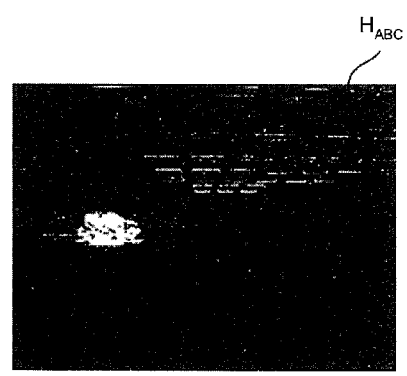
FIG. 5B illustrates a moving object extraction mask image generated by a mask generating unit according to a comparative example, in which the image reducing process and the image enlarging process are not performed before and after generation of the mask image.

Therefore, by reducing the size of the continuous image before the mask image is generated, noise in the mask image can be further reduced (see FIG. 5A) compared with a conventional case that a mask image is generated while the size of the continuous image is maintained as it is (see FIG. 5B). Consequently, it is possible to cancel out deviation in the image due to hand motion (camera shake). As a result, even when the image processing unit 4 is mounted on a small-sized imaging apparatus, such as the compact digital still camera 1, it is possible to obtain a stroboscopic motion image with high accuracy and in an adequately practical processing time.

Second Embodiment

A second embodiment has approximately the same configuration as the first embodiment described above. In the digital camera 1 according to the second embodiment, a configuration of an image processing unit 204 differs from the first embodiment but other configurations are the same as the first embodiment. Therefore, the same components are denoted by the same reference symbols of the first embodiment illustrated in FIG. 1 to FIG. 3, and only differences will be explained in detail below.

Figure 6:
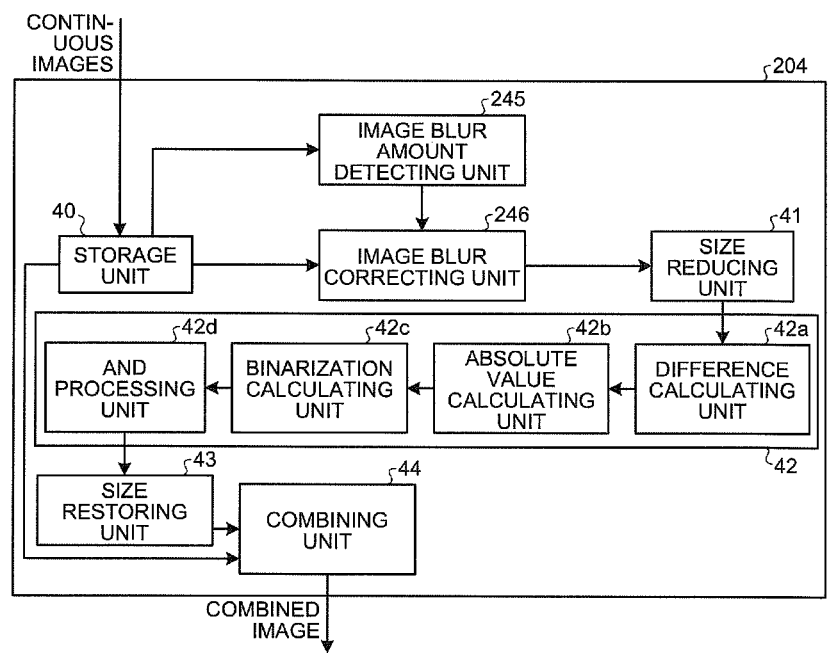
FIG. 6 is a schematic block diagram of an image processing unit of an imaging apparatus according to a second embodiment of the present invention.

As illustrated in FIG. 6, the image processing unit 204 according to the second embodiment includes the storage unit 40, an image blur amount detecting unit 245, an image blur correcting unit 246, the size reducing unit 41, the mask generating unit 42, the size restoring unit 43, and the combining unit 44.

The image blur amount detecting unit 245 detects the amount of image blur in a continuous image before the continuous image is reduced by the size reducing unit 41. The image blur amount detecting unit 245 detects the amount of image blur by using a certain image. As a method for the detection, for example, a block matching method is used.

The image blur correcting unit 246 corrects image blur in the continuous image according to the amount of image blur detected by the image blur amount detecting unit 245 before the continuous image is reduced by the size reducing unit 41.

The flow of an image processing method performed by the digital camera 1 according to the second embodiment will be explained below with reference to a flowchart in FIG. 7. The image processing method includes an image blur correcting step, a size reducing step, a mask generating step, a size restoring step, and an image combining step. At the image blur correcting step, the amount of image blur in the continuous image is detected and the image blur in the continuous image is corrected according to the amount of image blur before the size reducing step.

First, continuous images are sequentially input from the imaging unit 2 to the image processing unit 4 (Step S1). Subsequently, the image blur amount detecting unit 245 detects the amount of image blur in each of the input images (Step S201), which is an example of the image blur correcting step. For example, in the block matching method, the same objects are associated with each other between two images that are captured at different times and a motion vector is detected as the amount of movement.

Figures 8A, 8B:
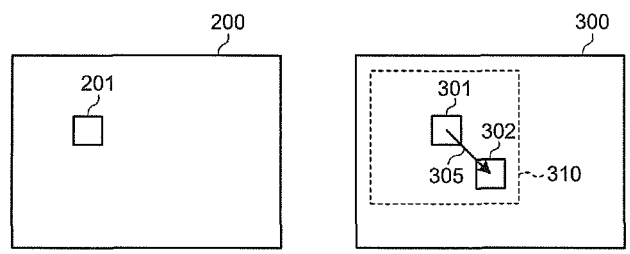
FIGS. 8A and 8B are diagrams for schematically explaining the principle of correcting image blur by the image processing unit of the imaging apparatus according to the second embodiment of the present invention, where an image in FIG. 8A is captured at a reference time $t_0$ and an image in FIG. 8B is captured at a time $t_1$ after the reference time $t_0$.

As illustrated in FIG. 8A, an image 200 is captured at a certain time $t_0$. As illustrated in FIG. 8B, an image 300 is captured at a time $t_1$ different from the time $t_0$.

In this example a motion vector of a region 201 at a position (i, j) in the image 200 is detected. The region 201 includes a total of (M×N) pixels, where M is the number of pixels in the horizontal direction and N is the number of pixels in the vertical direction. A similarity calculation using the region 201 as a template is performed in a neighborhood region (image) 310 of a region 301 located at the same position of the region 201 in the image 300, and the position with the highest similarity or with the lowest dissimilarity is determined as a corresponding region.

When a region 302 in FIG. 8B is the region corresponding to the template, the motion vector is a vector 305 from the center of the region 301 to the center of the region 302. The motion vector is assumed as a motion vector $V_{ij}$.

The index of the dissimilarity is preferably represented by, for example, sum of absolute difference (SAD). SAD is represented by Equation (1) below.

$$R(x, y) = \sum_{i}^{M} \sum_{j}^{N} |I(i+x, j+y) - T(i, j)| \quad (1)$$

R is the dissimilarity calculated by SAD, I is a partial region coinciding with the region 301 in the image 300 when x=y=0, and T is the region 201 serving as the template. In the neighborhood region 310, SAD is calculated by changing x and y, and the corresponding region 302 is determined based on a smallest x value $x_{min}$ and a smallest y value $y_{min}$. That is, $V_{ij}=(x_{min}, y_{min})$.

Subsequently, the image blur correcting unit 246 corrects image blur in the continuous image according to the amount of image blur detected by the image blur amount detecting unit 245 (Step S202). When the image blur is corrected in the image 300 described above, the image blur correcting unit 246 performs a process for shifting the image 300 by $V_{ij}$ in an opposite direction in accordance with the amount of image blur $V_{ij}=(x_{min}, y_{min})$ detected by the image blur amount detecting unit 245.

Subsequent processes are the same as the processes from Step S2 of the first embodiment; therefore, the same explanation will not be repeated.

As described above, the image processing unit 204 according to the second embodiment performs an image blur correction process on the continuous images before the size reducing unit 41 performs processing. Therefore, even when there is large image blur that cannot be cancelled out by the processing performed by the size reducing unit 41 and the size restoring unit 43 of the first embodiment, it is possible to appropriately extract a moving object region. As a result, it is possible to prevent erroneous masking of the background region even when large image blur occurs. Besides, because the image blur is corrected by image processing, it is possible to reduce load on the imaging apparatus and shorten the processing time.

Third Embodiment

A third embodiment has approximately the same configuration as the first embodiment described above. In the digital camera 1 according to the third embodiment, a configuration of an image processing unit 304 differs from the first embodiment but other configurations are the same as the first embodiment. Therefore, the same components are denoted by the same reference symbols of the first embodiment illustrated in FIG. 1 to FIG. 3, and only differences will be explained in detail below.

Figure 9:
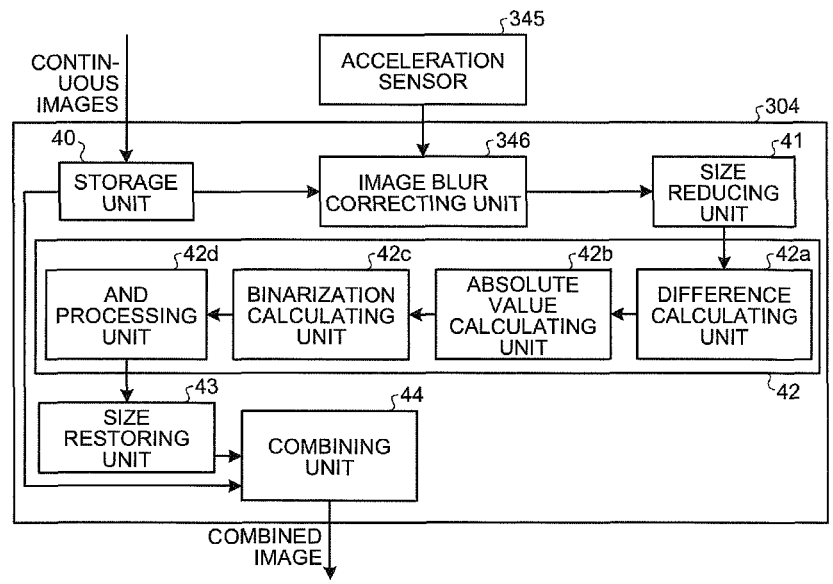
FIG. 9 is a schematic block diagram of an image processing unit of an imaging apparatus according to a third embodiment of the present invention.

As illustrated in FIG. 9, the image processing unit 304 according to the third embodiment includes the storage unit 40, an image blur amount detecting unit 345, an image blur correcting unit 346, the size reducing unit 41, the mask generating unit 42, the size restoring unit 43, and the combining unit 44.

The image blur amount detecting unit 345 detects the amount of image blur in a continuous image before the continuous image is reduced by the size reducing unit 41. The image blur amount detecting unit 345 is an external sensor provided in the imaging apparatus. As the external sensor, for example, an acceleration sensor may be used (in FIG. 9, illustrated as the acceleration sensor).

The image blur correcting unit 346 corrects image blur in the continuous image according to the amount of image blur detected by the image blur amount detecting unit 345 before the continuous image is reduced by the size reducing unit 41.

Figure 10:
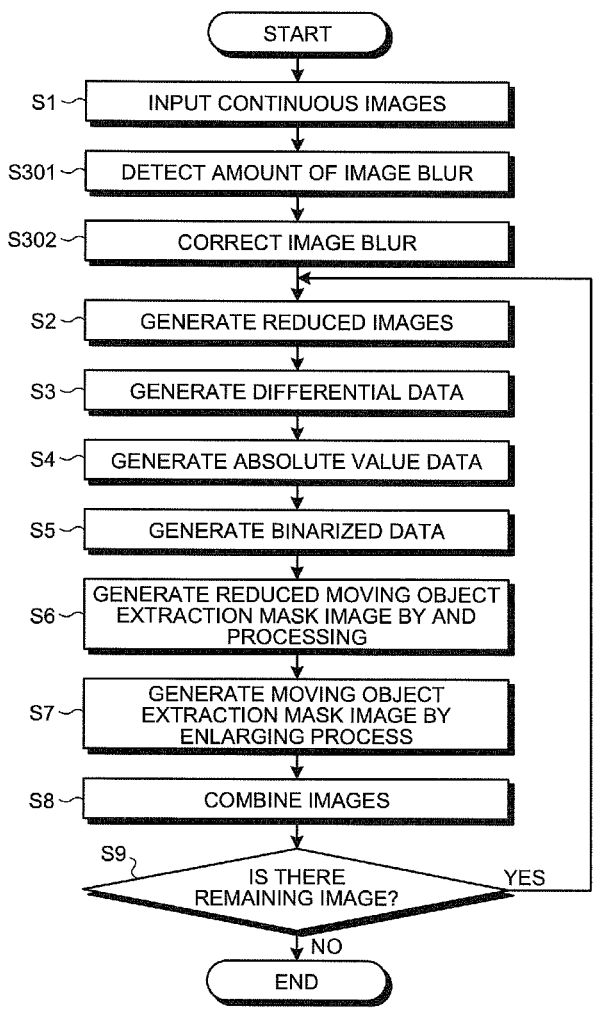
FIG. 10 is a flowchart illustrating the flow of a process performed by the image processing unit of the imaging apparatus according to the third embodiment of the present invention.

The flow of an image processing method performed by the digital camera 1 according to the third embodiment will be explained below with reference to a flowchart in FIG. 10. The image processing method includes an image blur correcting step, a size reducing step, a mask generating step, a size restoring step, and an image combining step. At the image blur correcting step, the amount of image blur in the continuous image is detected and the image blur in the continuous image is corrected according to the amount of image blur before the size reducing step.

First, continuous images are sequentially input from the imaging unit 2 to the image processing unit 4 (Step S1). Subsequently, the image blur amount detecting unit 345 detects the amount of image blur in each of the input images (Step S301), which is an example of the image blur correcting step.

Figure 11:
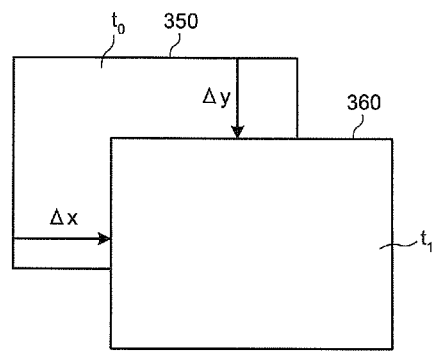
FIG. 11 is a diagram for schematically explaining the principle of correcting image blur by the image processing unit of the imaging apparatus according to the third embodiment of the present invention.

For example, as illustrated in FIG. 11, an image 350 is captured at a certain time $t_0$ and an image 360 is captured at a time $t_1$ different from the time $t_0$. The acceleration sensor detects a moving amount $\Delta x$ of the digital camera 1 in the horizontal direction and a moving amount $\Delta y$ of the digital camera 1 in the vertical direction with respect to the object between the time $t_0$ and the time $t_0$.

The image blur correcting unit 346 corrects the image blur in the continuous image according to the amount of image blur detected by the image blur amount detecting unit 345 (Step S302). When the image blur is corrected in the image 310 described above, a process is performed for shifting the image 310 in an opposite direction by the amount of image blur ($\Delta x$, $\Delta y$) detected by the image blur amount detecting unit 345.

Subsequent processes are the same as the processes from Step S2 of the first embodiment; therefore, the same explanation will not be repeated.

As described above, the image processing unit 304 according to the third embodiment includes the image blur amount detecting unit 345 being the acceleration sensor. Therefore, it is possible to detect the actual amount of deviation of the digital camera 1 with high accuracy.

Fourth Embodiment

A fourth embodiment has approximately the same configuration as the first embodiment described above. In the digital camera 1 according to the fourth embodiment, a configuration of an image processing unit 404 differs from the first embodiment but other configurations are the same as the first embodiment. Therefore, the same components are denoted by the same reference symbols of the first embodiment illustrated in FIG. 1 to FIG. 3, and only differences will be explained in detail below.

Figure 12:
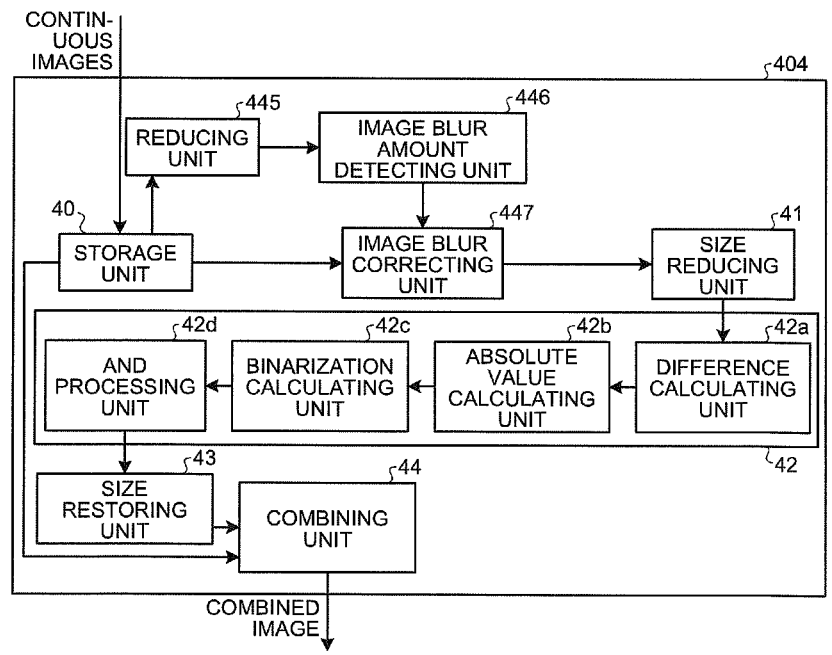
FIG. 12 is a schematic block diagram of an image processing unit of an imaging apparatus according to a fourth embodiment of the present invention.

As illustrated in FIG. 12, the image processing unit 404 according to the fourth embodiment includes the storage unit 40, a reducing unit 445, an image blur amount detecting unit 446, an image blur correcting unit 447, the size reducing unit 41, the mask generating unit 42, the size restoring unit 43, and the combining unit 44.

The reducing unit 445 reduces the size of an image used for detecting the amount of image blur before image blur in a continuous image is corrected. The image blur amount detecting unit 446 detects the amount of image blur in the continuous image before the continuous image is reduced by the size reducing unit 41. The image blur amount detecting unit 446 detects the amount of image blur by using the image by using, for example, a block matching method as a method for the detection.

The image blur correcting unit 447 corrects image blur in the continuous image according to the amount of image blur detected by the image blur amount detecting unit 446 before the continuous image is reduced by the size reducing unit 41.

Figure 13:
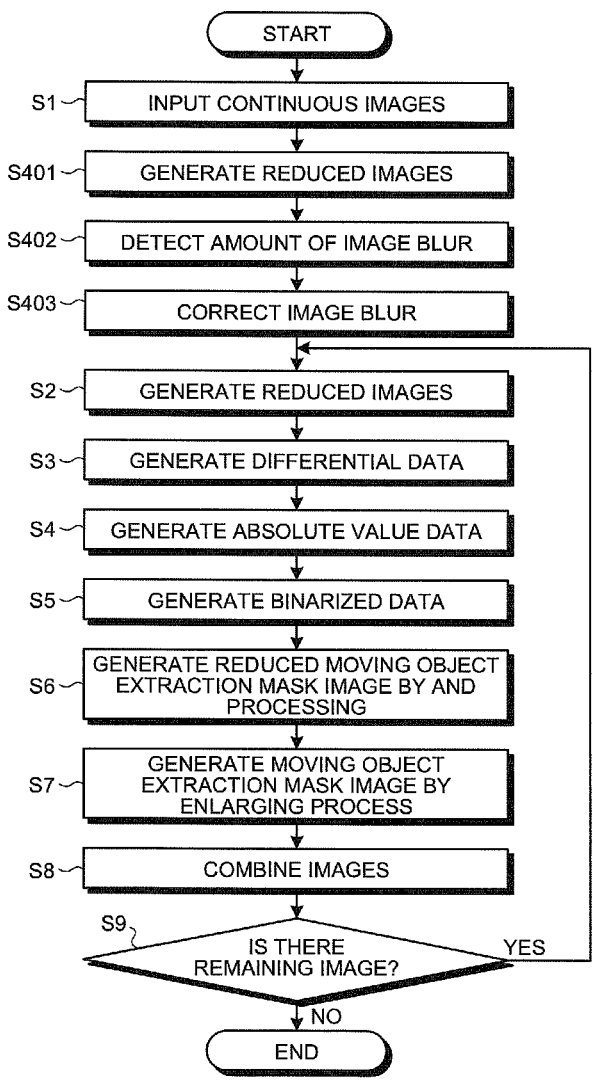
FIG. 13 is a flowchart illustrating the flow of a process performed by the image processing unit of the imaging apparatus according to the fourth embodiment of the present invention.

The flow of an image processing method performed by the digital camera 1 according to the fourth embodiment will be explained below with reference to a flowchart in FIG. 13. The image processing method includes an image blur correcting step, a size reducing step, a mask generating step, a size restoring step, and an image combining step. At the image blur correcting step, a continuous image is reduced, the amount of image blur in the continuous image is detected, and the image blur in the continuous image is corrected according to the amount of image blur before the size reducing step.

First, continuous images are sequentially input from the imaging unit 2 to the image processing unit 4 (Step S1).

Subsequently, the reducing unit 445 reduces a continuous image as an image blur amount detection image (Step S401), which is an example of the image blur correcting step. The image blur amount detecting unit 446 detects the amount of image blur in each of the reduced images (Step S402). The image blur correcting unit 447 corrects the image blur in the continuous image according to the amount of image blur detected by the image blur amount detecting unit 446 (Step S403).

Subsequent processes are the same as the processes from Step S2 of the first embodiment; therefore, the same explanation will not be repeated.

As described above, in the image processing unit 404 according to the fourth embodiment, the reducing unit 445 reduces an image used for detection before the image blur amount detecting unit 446 detects the amount of image blur. Therefore, for example, it is possible to reduce the size of a search area or a template in the block matching, enabling to reduce the number of calculations. As a result, it is possible to shorten the processing time and reduce processing costs compared with a case that the image is not reduced.

Fifth Embodiment

A fifth embodiment has approximately the same configuration as the first embodiment described above. In the digital camera 1 according to the fifth embodiment, a configuration of an image processing unit 504 differs from the first embodiment but other configurations are the same as the first embodiment. Therefore, the same components are denoted by the same reference symbols of the first embodiment illustrated in FIG. 1 to FIG. 3, and only differences will be described in detail below.

Figure 14:
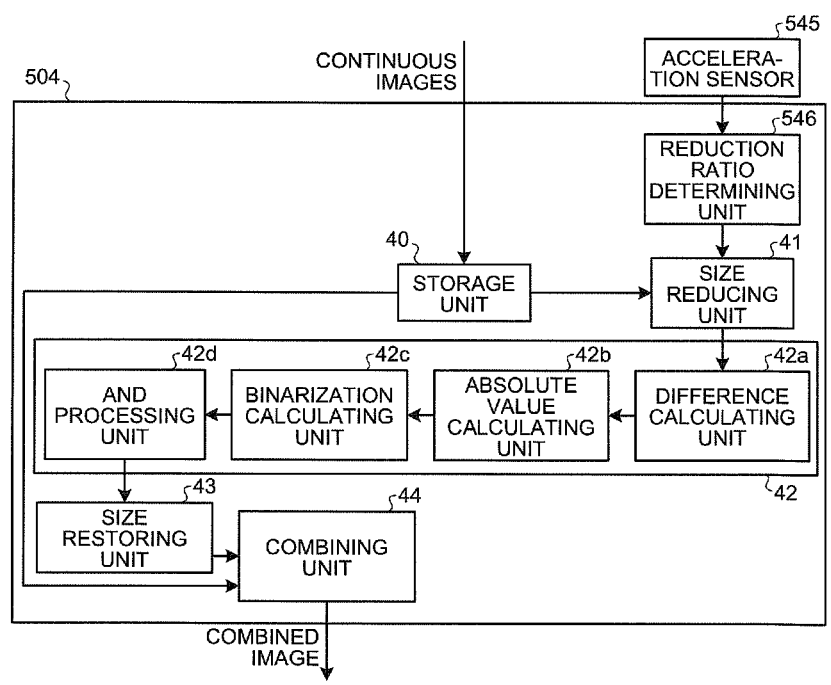
FIG. 14 is a schematic block diagram of an image processing unit of an imaging apparatus according to a fifth embodiment of the present invention.

As illustrated in FIG. 14, the image processing unit 504 according to the fifth embodiment includes the storage unit 40, an image blur amount detecting unit 545, a reduction ratio determining unit 546, the size reducing unit 41, the mask generating unit 42, the size restoring unit 43, and the combining unit 44.

The image blur amount detecting unit 545 detects the amount of image blur in a continuous image before the continuous image is reduced by the size reducing unit 41. The image blur amount detecting unit 545 is an external sensor provided in the imaging apparatus. As the external sensor, for example, an acceleration sensor may be used (in FIG. 14, illustrated as the acceleration sensor).

The reduction ratio determining unit 546 determines a reduction ratio, which is used for reducing the continuous image by the size reducing unit 41, according to the amount of image blur detected by the image blur amount detecting unit 545, before the continuous image is reduced by the size reducing unit 41.

Figure 15:
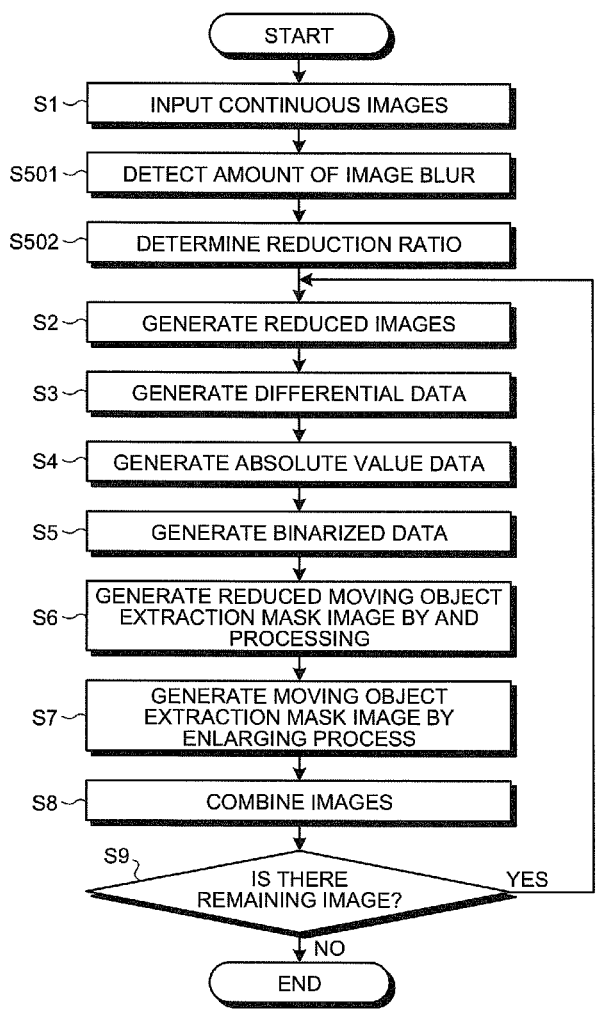
FIG. 15 is a flowchart illustrating the flow of a process performed by the image processing unit of the imaging apparatus according to the fifth embodiment of the present invention.

The flow of an image processing method performed by the digital camera 1 according to the fifth embodiment will be explained below with reference to a flowchart in FIG. 15. The image processing method includes a reduction ratio determining step, a size reducing step, a mask generating step, a size restoring step, and an image combining step. At the reduction ratio determining step, the amount of image blur in the continuous image is detected and the reduction ratio used for reducing the continuous image is determined according to the amount of image blur before the size reducing step.

First, continuous images are sequentially input from the imaging unit 2 to the image processing unit 4 (Step 51). Subsequently, the image blur amount detecting unit 545 detects the amount of image blur in each of the input images (Step S501), which is an example of the reduction ratio determining step. The reduction ratio determining unit 546 determines the reduction ratio, which is used for reducing the continuous image by the size reducing unit 41, according to the amount of image blur detected by the image blur amount detecting unit 545 (Step S502).

For example, it is assumed that the reduction ratio initially set by the size reducing unit 41 is $1/M_0$ (for example, 1/16etc.), and the amount of image blur to be cancelled out by the reduction is $M_0/k$ pixels. Here, the value of k can appropriately be set by the digital camera 1 to be used.

When the amount of actual image blur exceeds the amount of image blur estimated by the initial setting, a reduction ratio used by the size reducing unit 41 is changed from the initially-set reduction ratio $M_0$ to M1. The reduction ratio is changed by, for example, the expression below.

$$M_1 = \alpha \times M_0$$

$\alpha$ is a coefficient appropriately changed depending on the number of pixels detected by the image blur amount detecting unit 545. For example, when the number of pixels of the image blur detected by the image blur amount detecting unit 545 is the same as the $M_0/k$ pixels, $\alpha=1$. When the number of pixels of the image blur detected by the image blur amount detecting unit 545 is $M_0$ pixels, $\alpha=k$. The size reducing unit 41 reduces the continuous image by using the obtained corrected reduction ratio $M_1$.

Subsequent processes are the same as the processes from Step S2 of the first embodiment; therefore, the same explanation will not be repeated.

As described above, in the image processing unit 504 according to the fifth embodiment, the reduction ratio determining unit 546 determines the reduction ratio, which is used for reducing the continuous image by the size reducing unit 41, according to the amount of image blur detected by the image blur amount detecting unit 545. Therefore, even when the amount of actual image blur becomes greater than the amount of image blur estimated at the initially-set reduction ratio, it is possible to appropriately extract a moving object region. As a result, it is possible to prevent erroneous masking of the background region even when large image blur occurs.

Furthermore, according to the fifth embodiment, $\alpha$ is appropriately set according to the number of pixels of the image blur detected by the image blur amount detecting unit 545 and calculation is performed every time by using the equation of $M_1=\alpha \times M_0$. However, the embodiment is not limited to this example. For example, it may be possible to store a lookup table in advance in the reduction ratio determining unit 546 and output the reduction ratio by referring to the lookup table according to the number of pixels of the image blur detected by the image blur amount detecting unit 545.

Sixth Embodiment

A sixth embodiment has approximately the same configuration as the first embodiment described above. In the digital camera 1 according to the sixth embodiment, a configuration of an image processing unit 604 differs from the first embodiment but other configurations are the same as the first embodiment. Therefore, the same components are denoted by the same reference symbols of the first embodiment illustrated in FIG. 1 to FIG. 3, and only differences will be explained in detail below.

Figure 16:
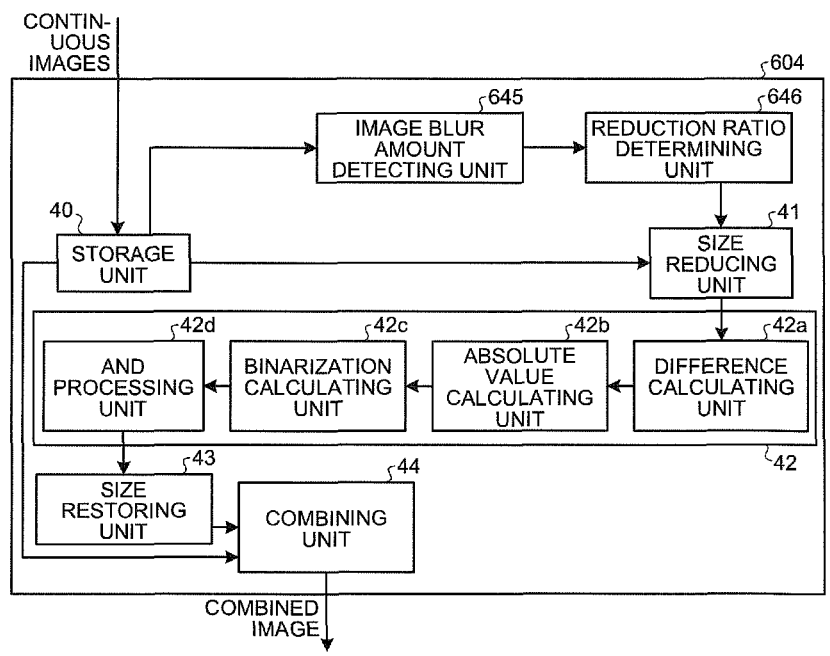
FIG. 16 is a schematic block diagram of an image processing unit of an imaging apparatus according to a sixth embodiment of the present invention.

As illustrated in FIG. 16, the image processing unit 604 according to the sixth embodiment includes the storage unit 40, an image blur amount detecting unit 645, a reduction ratio determining unit 646, the size reducing unit 41, the mask generating unit 42, the size restoring unit 43, and the combining unit 44.

The image blur amount detecting unit 645 detects the amount of image blur in a continuous image before the continuous image is reduced by the size reducing unit 41. The image blur amount detecting unit 645 detects the amount of image blur by using a certain image. As a method for detecting the amount of image blur, for example, a difference between images is calculated.

The reduction ratio determining unit 646 determines a reduction ratio, which is used for reducing the continuous image by the size reducing unit 41, according to the amount of image blur detected by the image blur amount detecting unit 645, that is, the amount of a difference, before the continuous image is reduced by the size reducing unit 41.

Figure 17:
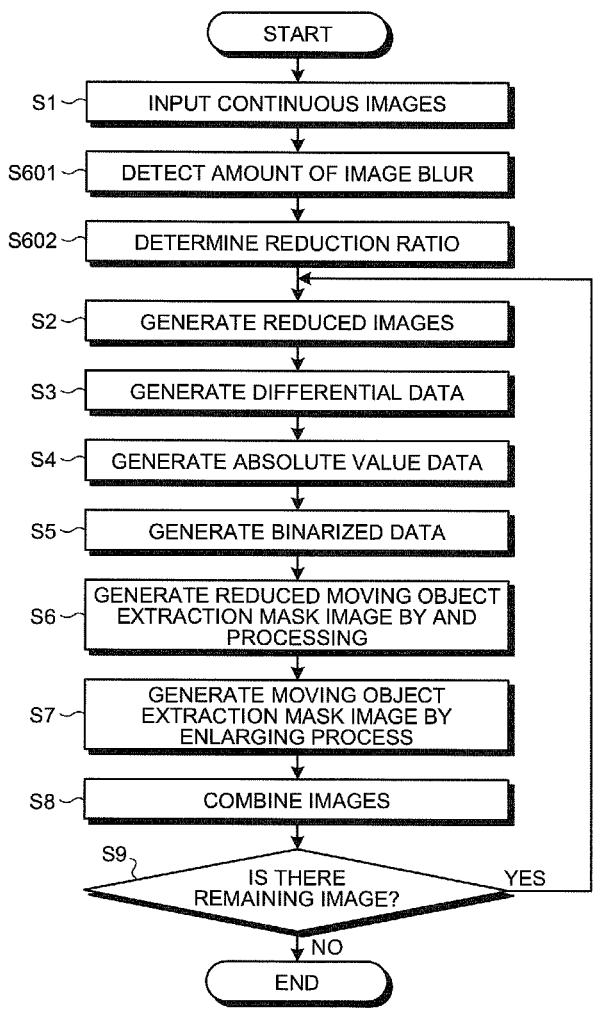
FIG. 17 is a flowchart illustrating the flow of a process performed by the image processing unit of the imaging apparatus according to the sixth embodiment of the present invention.

The flow of an image processing method performed by the digital camera 1 according to the sixth embodiment will be explained below with reference to a flowchart in FIG. 17. The image processing method includes a reduction ratio determining step, a size reducing step, a mask generating step, a size restoring step, and an image combining step. At the reduction ratio determining step, the amount of image blur in the continuous image is detected and the reduction ratio for reducing the continuous image is determined according to the amount of image blur before the size reducing step.

First, continuous images are sequentially input from the imaging unit 2 to the image processing unit 4 (Step S1). Subsequently, the image blur amount detecting unit 645 detects the amount of image blur in each of the input reduced images (Step S601), which is an example of the reduction ratio determining step. The reduction ratio determining unit 646 determines the reduction ratio, which is used for reducing the continuous image by the size reducing unit 41, according to the amount of image blur detected by the image blur amount detecting unit 645 (Step S602).

Figure 18A:
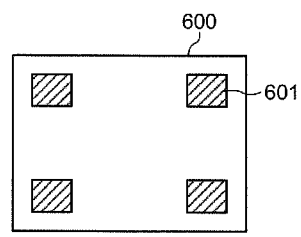
FIGS. 18A to 18C are diagrams for schematically explaining portions at which differences are detected by the image processing unit of the imaging apparatus according to the sixth embodiment of the present invention, where the portions are located slightly inside the four corners of an image in FIG. 18A, the portions are located at the four corners of the image in FIG. 18B, and the portions are located at the periphery of the image in FIG. 18C.

For example, as illustrated in FIG. 18A, the image blur amount detecting unit 645 detects differences at four positions of portions 601 inside the four corners of an image 600. Then, the amount of difference per pixel is calculated based on the differences between the four positions. The reduction ratio determining unit 646 determines the reduction ratio according to the amount of difference obtained by the image blur amount detecting unit 645. For example, when the amount of difference obtained by the image blur amount detecting unit 645 is greater than the estimated amount, the image is reduced to be smaller.

Subsequent processes are the same as the processes from Step S2 of the first embodiment; therefore, the same explanation will not be repeated.

As described above, in the image processing unit 604 according to the sixth embodiment, the image blur amount detecting unit 645 detects differences at the four positions of the portions 601 inside the four corners of the image 600. Therefore, it is possible to detect the amount of image blur while excluding the center portion of the image in which a moving object is likely to be present. Therefore, calculation of the amount of image blur is less likely to be influenced by a moving object, and the amount of image blur can be detected with high accuracy. As a result, it is possible to prevent erroneous masking of the background region even when large image blur occurs.

Figure 18B:
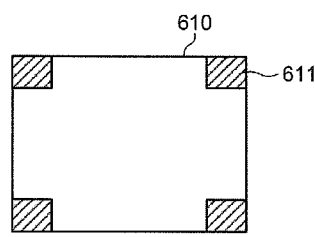
Figure 18C:
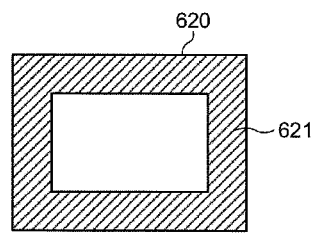

In the sixth embodiment, the image blur amount detecting unit 645 detects differences at four positions of the portions 601 inside the four corners of the image 600. However, the embodiment is not limited to this example. For example, as illustrated in FIG. 18B, it may be possible to detect differences at four positions of four corners 611 of an image 610. Alternatively, as illustrated in FIG. 18C, it may be possible to detect differences at a peripheral portion 621 of an image 620 or detect differences in the whole image.

Seventh Embodiment

A seventh embodiment has approximately the same configuration as the first embodiment described above. In the digital camera 1 according to the seventh embodiment, a configuration of an image processing unit 704 differs from the first embodiment but other configurations are the same as the first embodiment. Therefore, the same components are denoted by the same reference symbols of the first embodiment illustrated in FIG. 1 to FIG. 3, and only differences will be explained in detail below.

Figure 19:
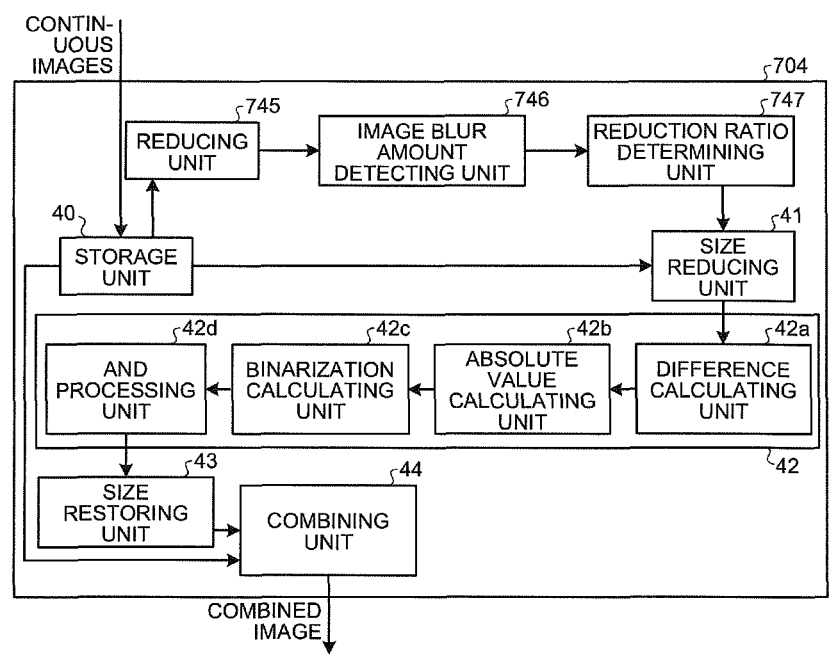
FIG. 19 is a schematic block diagram of an image processing unit of an imaging apparatus according to a seventh embodiment of the present invention.

As illustrated in FIG. 19, the image processing unit 704 according to the seventh embodiment includes the storage unit 40, a reducing unit 745, an image blur amount detecting unit 746, a reduction ratio determining unit 747, the size reducing unit 41, the mask generating unit 42, the size restoring unit 43, and the combining unit 44.

The reducing unit 745 reduces the size of an image used for detecting the amount of image blur before the amount of image blur in a continuous image is detected. The image blur amount detecting unit 746 detects the amount of image blur in the continuous image before the continuous image is reduced by the size reducing unit 41. The image blur amount detecting unit 746 detects the amount of image blur by using a certain image. As a method for detecting the amount of image blur, for example, a difference between images is calculated.

The reduction ratio determining unit 747 determines a reduction ratio, which is used for reducing the continuous image by the size reducing unit 41, according to the amount of image blur detected by the image blur amount detecting unit 746, that is, the amount of a difference, before the continuous image is reduced by the size reducing unit 41.

Figure 20:
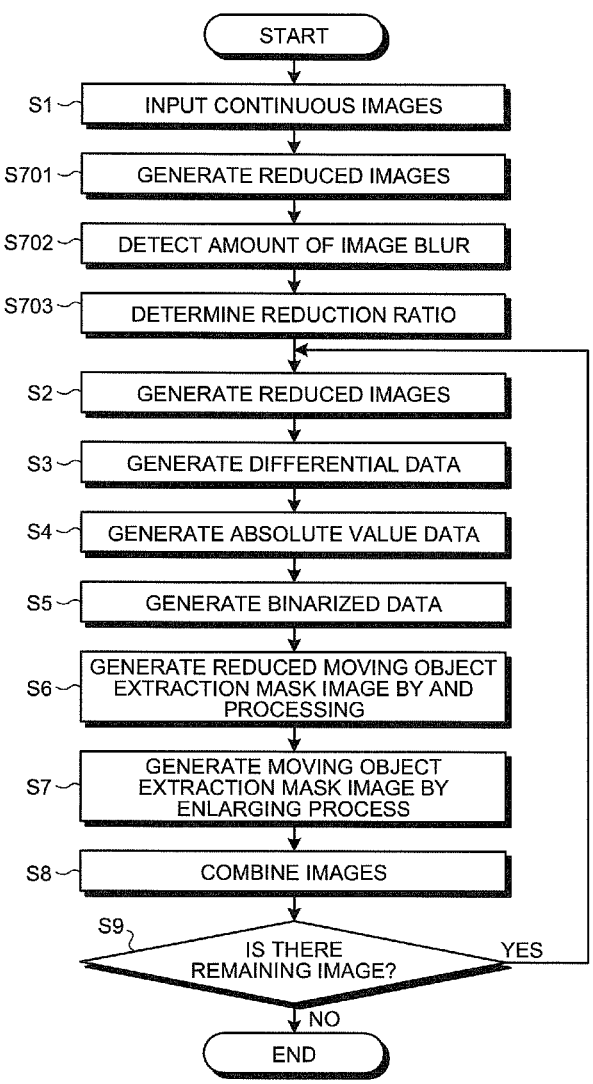
FIG. 20 is a flowchart illustrating the flow of a process performed by the image processing unit of the imaging apparatus according to the seventh embodiment of the present invention.

The flow of an image processing method performed by the digital camera 1 according to the seventh embodiment will be explained below with reference to a flowchart in FIG. 20. The image processing method includes a reduction ratio determining step, a size reducing step, a mask generating step, a size restoring step, and an image combining step. At the reduction ratio determining step, the amount of image blur in the continuous image is detected and the reduction ratio for reducing the continuous image is determined according to the amount of image blur before the size reducing step.

First, continuous images are sequentially input from the imaging unit 2 to the image processing unit 4 (Step S1). Subsequently, the reducing unit 745 reduces a continuous image as an image blur amount detection image (Step S701), which is an example of the reduction ratio determining step. The image blur amount detecting unit 746 detects the amount of image blur in each of the reduced images (Step S702). The reduction ratio determining unit 747 determines the reduction ratio, which is used for reducing the continuous image by the size reducing unit 41, according to the amount of image blur detected by the image blur amount detecting unit 746 (Step S703).

Subsequent processes are the same as the processes from Step S2 of the first embodiment; therefore, the same explanation will not be repeated.

As described above, in the image processing unit 704 according to the seventh embodiment, the reducing unit 745 reduces an image used for detection before the image blur amount detecting unit 746 detects the amount of image blur. Therefore, for example, it is possible to reduce the size of a search area or a template in the block matching, enabling to reduce the number of calculations. As a result, it is possible to shorten the processing time and reduce processing costs compared with a case that the image is not reduced.

Eighth Embodiment

An eighth embodiment has approximately the same configuration as the first embodiment described above. In the digital camera 1 according to the eighth embodiment, a configuration of an image processing unit 804 differs from the first embodiment but other configurations are the same as the first embodiment. Therefore, the same components are denoted by the same reference symbols of the first embodiment illustrated in FIG. 1 to FIG. 3, and only differences will be explained in detail below.

Figure 21:
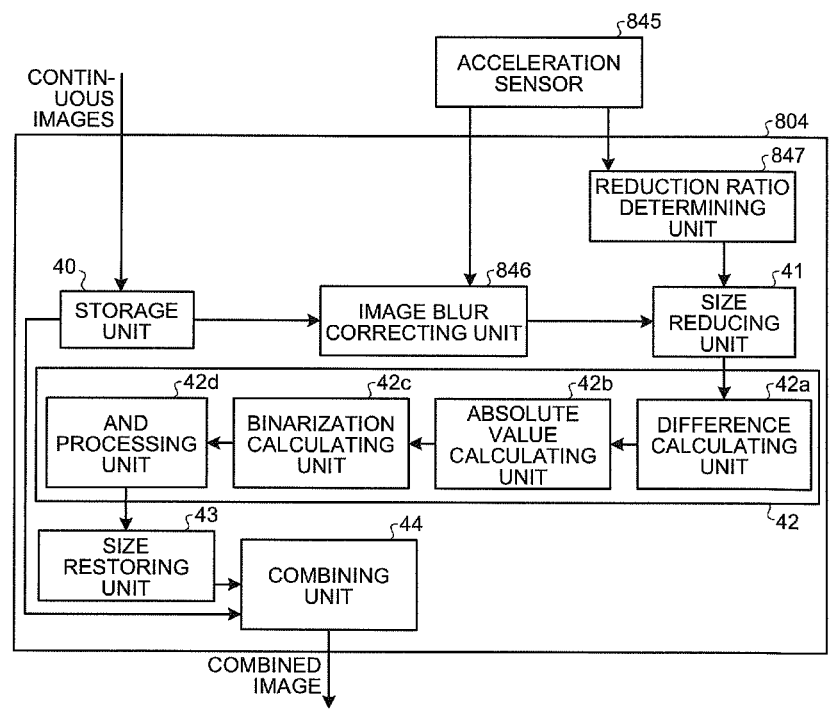
FIG. 21 is a schematic block diagram of an image processing unit of an imaging apparatus according to an eighth embodiment of the present invention.

As illustrated in FIG. 21, the image processing unit 804 according to the eighth embodiment includes the storage unit 40, an image blur amount detecting unit 845, an image blur correcting unit 846, a reduction ratio determining unit 847, the size reducing unit 41, the mask generating unit 42, the size restoring unit 43, and the combining unit 44.

The image blur amount detecting unit 845 detects the amount of image blur in a continuous image before the continuous image is reduced by the size reducing unit 41. The image blur amount detecting unit 845 is an external sensor provided in the imaging apparatus. As the external sensor, for example, an acceleration sensor may be used (in FIG. 21, illustrated as the acceleration sensor).

The image blur correcting unit 846 corrects image blur in the continuous image according to the amount of image blur detected by the image blur amount detecting unit 845 before the continuous image is reduced by the size reducing unit 41.

The reduction ratio determining unit 847 determines a reduction ratio, which is used for reducing the continuous image by the size reducing unit 41, according to the amount of image blur detected by the image blur amount detecting unit 845, before the continuous image is reduced by the size reducing unit 41.

Figure 22:
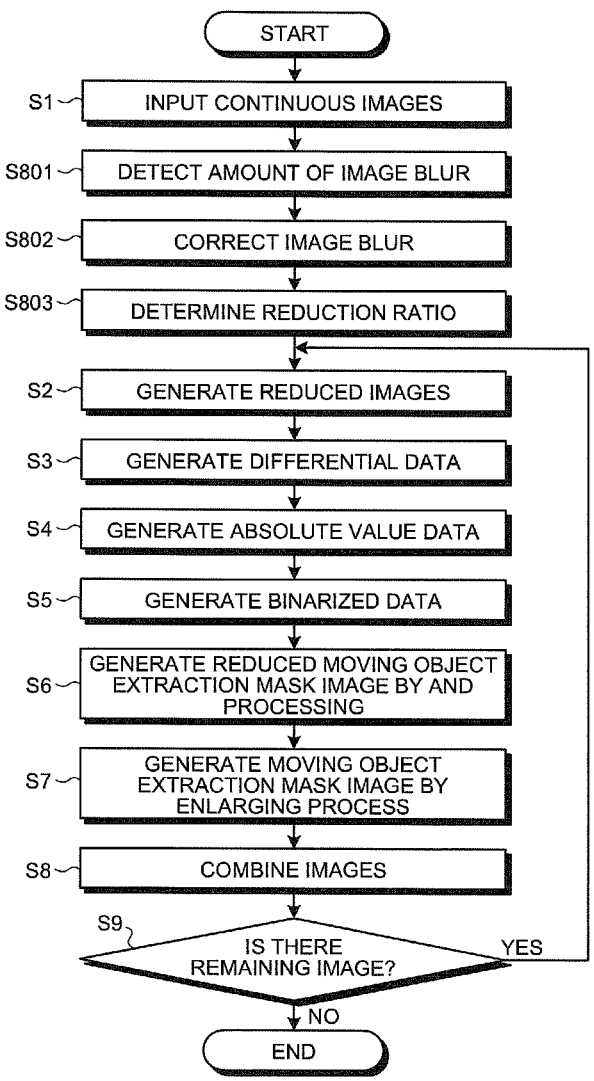
FIG. 22 is a flowchart illustrating the flow of a process performed by the image processing unit of the imaging apparatus according to the eighth embodiment of the present invention.

The flow of an image processing method performed by the digital camera 1 according to the eighth embodiment will be explained in detail below with reference to a flowchart in FIG. 22. The image processing method includes an image blur correcting step, a reduction ratio determining step, a size reducing step, a mask generating step, a size restoring step, and an image combining step.

At the image blur correcting step, the continuous image is reduced, the amount of image blur in the continuous image is detected, and the image blur in the continuous image is corrected according to the amount of image blur before the size reducing step. At the reduction ratio determining step, the reduction ratio for reducing the continuous image is determined according to the amount of image blur in the continuous image detected at the image blur correcting step before the size reducing step.

First, continuous images are sequentially input from the imaging unit 2 to the image processing unit 4 (Step S1). Subsequently, the image blur amount detecting unit 845 detects the amount of image blur in each of the input images (Step S801), which is an example of the image blur correcting step. The image blur correcting unit 846 corrects the image blur in the continuous image according to the amount of image blur detected by the image blur amount detecting unit 845 (Step S802). The reduction ratio determining unit 847 determines the reduction ratio, which is used for reducing the continuous image by the size reducing unit 41, according to the amount of image blur detected by the image blur amount detecting unit 845 (Step S803), which is an example of the reduction ratio determining step.

Subsequent processes are the same as the processes from Step S2 of the first embodiment; therefore, the same explanation will not be repeated.

As described above, the image processing unit 804 according to the eighth embodiment performs an image blur correction process and determines the reduction ratio before the size reducing unit 41 performs processing. Therefore, it is possible to more reliably prevent masking of the background region even when large image blur occurs.

Ninth Embodiment

A ninth embodiment has approximately the same configuration as the first embodiment described above. In the digital camera 1 according to the ninth embodiment, a configuration of an image processing unit 904 differs from the first embodiment but other configurations are the same as the first embodiment. Therefore, the same components are denoted by the same reference symbols of the first embodiment illustrated in FIG. 1 to FIG. 3, and only differences will be explained in detail below.

Figure 23:
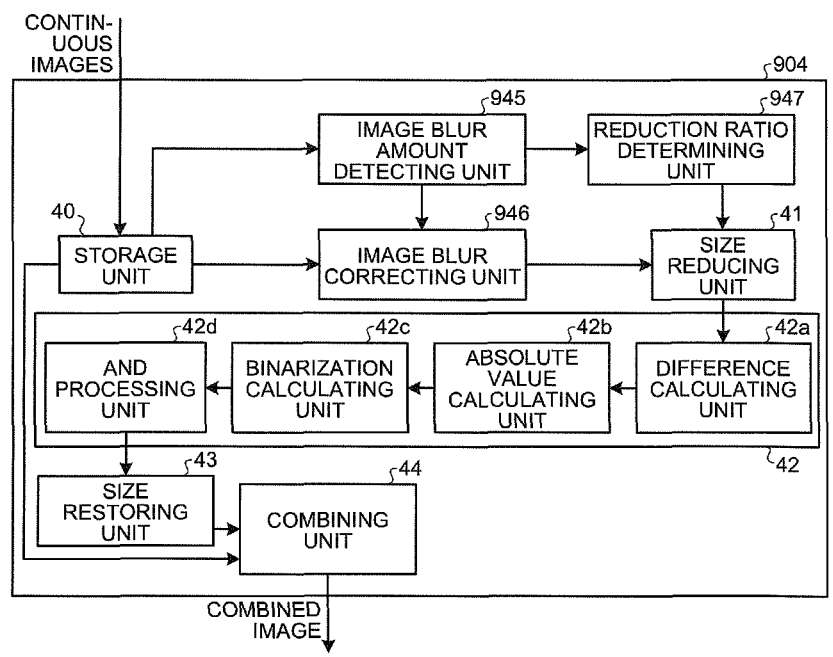
FIG. 23 is a schematic block diagram of an image processing unit of an imaging apparatus according to a ninth embodiment of the present invention.

As illustrated in FIG. 23, the image processing unit 904 according to the ninth embodiment includes the storage unit 40, an image blur amount detecting unit 945, an image blur correcting unit 946, a reduction ratio determining unit 947, the size reducing unit 41, the mask generating unit 42, the size restoring unit 43, and the combining unit 44.

The image blur amount detecting unit 945 detects the amount of image blur in a continuous image before the continuous image is reduced by the size reducing unit 41. The image blur amount detecting unit 945 detects the amount of image blur by using a certain image. As a method for the detection, for example, a block matching method is used similarly to the second embodiment.

The image blur correcting unit 946 corrects the image blur in the continuous image according to the amount of image blur detected by the image blur amount detecting unit 945 before the continuous image is reduced by the size reducing unit 41.

The reduction ratio determining unit 947 determines a reduction ratio, which is used for reducing the continuous image by the size reducing unit 41, according to the amount of image blur detected by the image blur amount detecting unit 945 before the continuous image is reduced by the size reducing unit 41.

Figure 24:
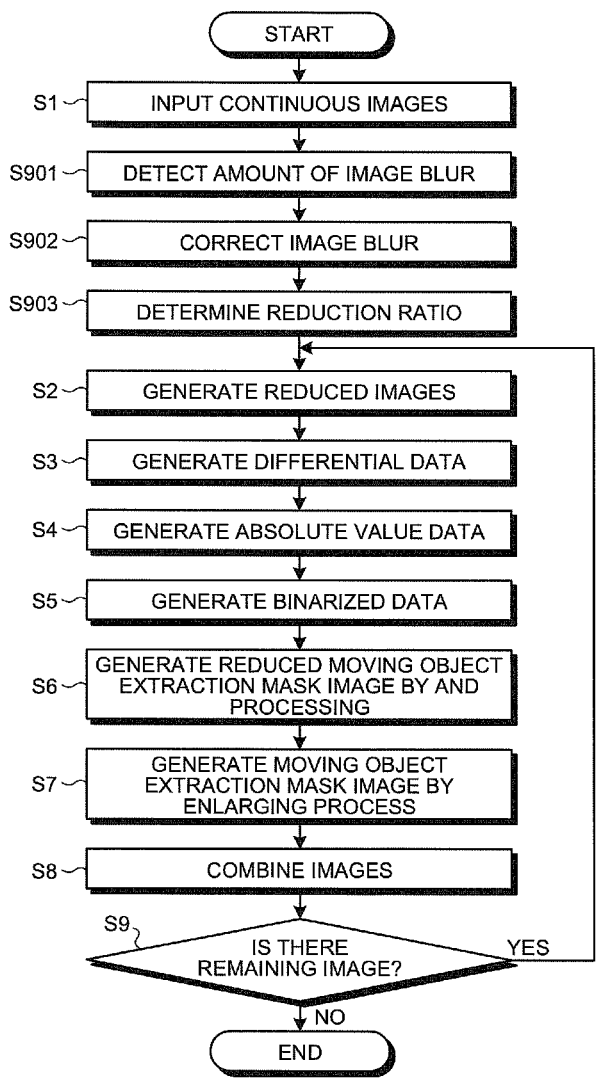
FIG. 24 is a flowchart illustrating the flow of a process performed by the image processing unit of the imaging apparatus according to the ninth embodiment of the present invention.

The flow of an image processing method performed by the digital camera 1 according to the ninth embodiment will be explained below with reference to a flowchart in FIG. 24. The image processing method includes an image blur correcting step, a reduction ratio determining step, a size reducing step, a mask generating step, a size restoring step, and an image combining step.

At the image blur correcting step, the continuous image is reduced, the amount of image blur is detected, and the image blur in the continuous images is corrected according to the amount of image blur before the size reducing step. At the reduction ratio determining step, the reduction ratio for reducing the continuous image is determined according to the amount of image blur in the continuous image detected at the image blur correcting step before the size reducing step.

First, continuous images are sequentially input from the imaging unit 2 to the image processing unit 4 (Step S1). Subsequently, the image blur amount detecting unit 945 detects the amount of image blur in each of the input images (Step S901), which is an example of the image blur correcting step. The image blur correcting unit 946 corrects the image blur in the continuous image according to the amount of image blur detected by the image blur amount detecting unit 945 (Step S902). The reduction ratio determining unit 947 determines the reduction ratio, which is used for reducing the continuous image by the size reducing unit 41, according to the amount of image blur detected by the image blur amount detecting unit 945 (Step S903), which is an example of the reduction ratio determining step.

Subsequent processes are the same as the processes from Step S2 of the first embodiment; therefore, the same explanation will not be repeated.

As described above, the image processing unit 904 according to the ninth embodiment performs an image blur correction process and determines the reduction ratio before the size reducing unit 41 performs processing. Therefore, it is possible to more reliably prevent erroneous masking of the background region even when large image blur occurs.

In the above embodiments, the image blur amount detecting unit 245, 345, 446, 545, 645, 746, 845, or 945 performs image processing with block matching or a difference or uses the acceleration sensor. However, the present invention is not limited to the above embodiments, and other method may be used.

EXAMPLES

A stroboscopic motion image was generated by using the digital camera 1 according to the first embodiment described above. In an example, the digital camera 1 captured images of a moving toy car at five frames per second. The images continuously captured are illustrated as images $I_A$ to $I_E$ in FIG. 4A to FIG. 4E.

First Example

Figure 3:
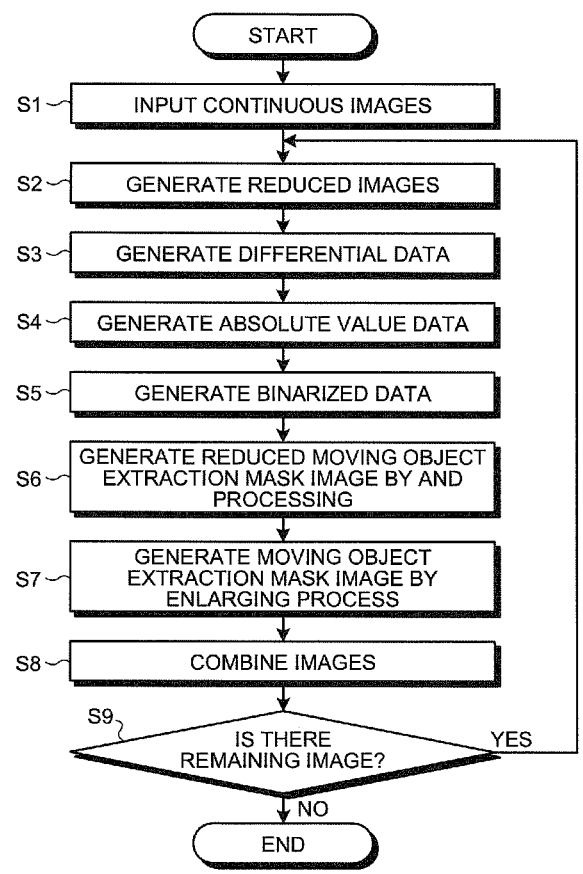
FIG. 3 is a flowchart illustrating the flow of a process performed by the image processing unit of the imaging apparatus according to the first embodiment of the present invention.

The moving object extraction mask image $G_{ABC}$ in the image $I_B$ was obtained by using the images $I_A$ to $I_C$ by the process according to the flowchart illustrated in FIG. 3. A resultant image is illustrated in FIG. 5A. As illustrated in FIG. 5A, the moving object extraction mask image $G_{ABC}$ is a clear mask image in which a contour approximately coincides with the contour of the toy car and less noise is present.

Figure 4A:
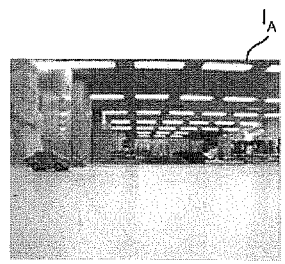
FIGS. 4A to 4E illustrate continuous images of a moving toy car captured by the imaging apparatus according to the first embodiment of the present invention, where images continuously captured at five frames per second are illustrated in FIGS. 4A to 4E and a stroboscopic motion image formed by combining the images in FIGS. 4A to 4E is illustrated in FIG. 4F.
Figure 4B:
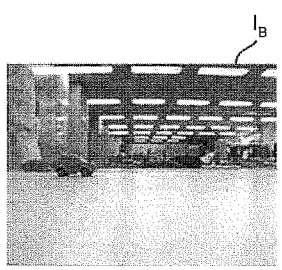
Figure 4C:
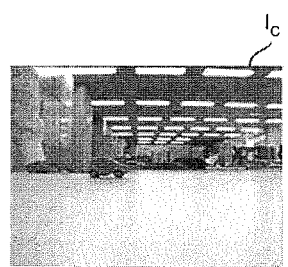
Figure 4D:
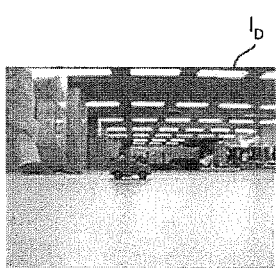
Figure 4E:
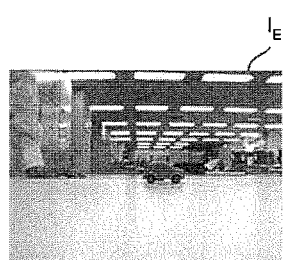
Figure 4F:
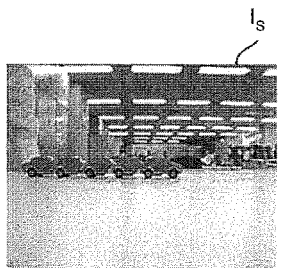

A stroboscopic motion image $I_S$ was generated by using the obtained moving object extraction mask image $G_{ABC}$ or the like. A resultant image is illustrated in FIG. 4F. As illustrated in FIG. 4F, the stroboscopic motion image $I_S$ was obtained in which no overlapping portion of a background and the toy car is seen in the background around the toy car and only the moving object appears moving while the background image appears standing still.

Comparative Example

A moving object extraction mask $H_{ABC}$ was generated by a process in accordance with the flowchart in FIG. 3 except for the process for generating the reduced image (Step S2) and the process for generating the moving object extraction mask image by enlarging the image (Step S7). A resultant image is illustrated in FIG. 5B. As illustrated in FIG. 5B, the moving object extraction mask $H_{ABC}$ is a mask image in which a lot of noise is present over the whole image and the contour is disturbed.

Therefore, it was confirmed that, by reducing the image before the mask image is generated and restoring the size of the image to the original size after the mask image is generated, it becomes possible to obtain a mask image, which is clear and in which the contour approximately coincides with the contour of a moving object and less noise is present.

According to at least one embodiment, a plurality of moving object images obtained from the continuous images of the moving object are combined in one image to generate a stroboscopic motion image.

Specifically, the continuous image is reduced in size before the mask generating unit performs processing, and the reduced moving object extraction mask image is enlarged to the original size after the mask generating unit completes the processing. Therefore, compared with a conventional case in which a mask image is generated by using the continuous image with the original size, it becomes possible to reduce noise in the mask image by reducing the size of the continuous image before generation of the mask image and deviation in the image caused by hand motion (camera shake) can be cancelled out. Therefore, even when the image processing apparatus is mounted on an imaging apparatus of a small size, such as a compact digital still camera, it is possible to obtain a stroboscopic motion image with high accuracy and in an adequately practical processing time.

According to the present invention, it is possible to provide an image processing apparatus, an imaging apparatus, and an image processing method capable of extracting moving object regions from background regions simply and highly accurately and combining the regions in one image even when the continuous image contains image blur caused by hand motion (camera shake) during image shooting.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus comprising:
a size reducing unit that reduces image sizes of a plurality of continuous images, which are still images obtained by continuously capturing images of a moving object, to thereby generate reduced-size continuous images that are smaller in image size than the plurality of corresponding continuous images;
a mask generating unit that extracts moving object regions from the reduced-size continuous images, to thereby generate reduced-size moving object extraction mask images;
a size restoring unit that enlarges the reduced-size moving object extraction mask images to the same image size as original image sizes of the continuous images that are not reduced by the size reducing unit, to thereby generate moving object extraction mask images;
a combining unit that extracts the moving object regions from the continuous images by using the moving object extraction mask images to thereby obtain moving object images, and combines the moving object images in a predetermined one of the continuous images;
an image blur amount detecting unit that detects an amount of image blur in each of the continuous images before the size reducing unit reduces the continuous images; and
a reduction ratio determining unit that determines a reduction ratio, which is used by the size reducing unit for reducing the continuous images, according to the amount of image blur before the size reducing unit reduces the continuous images.

2. The image processing apparatus according to claim 1, further comprising:
an image blur correcting unit that corrects image blur in each of the continuous images according to the amount of image blur before the size reducing unit reduces the continuous images.

3. The image processing apparatus according to claim 2, wherein the image blur amount detecting unit detects the amount of image blur in each of the continuous images by performing block matching on the continuous images.

4. The image processing apparatus according to claim 2, wherein the image blur amount detecting unit is an acceleration sensor that detects the amount of image blur.

5. The image processing apparatus according to claim 2, further comprising a reducing unit that reduces the sizes of the continuous images before the image blur amount detecting unit detects the amount of image blur in each of the continuous images.

6. An image processing apparatus comprising:
a size reducing unit that reduces sizes of a plurality of continuous images, which are still images obtained by continuously capturing images of a moving object, to thereby generate reduced continuous images;
a mask generating unit that extracts moving object regions from the reduced continuous images, to thereby generate reduced moving object extraction mask images;
a size restoring unit that enlarges the reduced moving object extraction mask images to the same size as original sizes of the continuous images that are not reduced by the size reducing unit, to thereby generate moving object extraction mask images;
a combining unit that extracts the moving object regions from the continuous images by using the moving object extraction mask images to thereby obtain moving object images, and combines the moving object images in a predetermined one of the continuous images;
an image blur amount detecting unit that detects an amount of image blur in each of the continuous images before the size reducing unit reduces the continuous images; and
a reduction ratio determining unit that determines a reduction ratio, which is used by the size reducing unit for reducing the continuous images, according to the amount of image blur before the size reducing unit reduces the continuous images.

7. The image processing apparatus according to claim 6, wherein the image blur amount detecting unit detects the amount of image blur in each of the continuous images based on differences between the continuous images.

8. The image processing apparatus according to claim 7, wherein the differences are differences at four corners of the continuous images.

9. The image processing apparatus according to claim 6, wherein the image blur amount detecting unit detects the amount of image blur in each of the continuous images by performing block matching on the continuous images.

10. The image processing apparatus according to claim 6, wherein the image blur amount detecting unit is an acceleration sensor that detects the amount of image blur.

11. The image processing apparatus according to claim 6, further comprising a reducing unit that reduces the sizes of the continuous images before the image blur amount detecting unit detects the amount of image blur in each of the continuous images.

12. An imaging apparatus comprising:
an imaging unit that continuously captures images of a moving object to generate a plurality of continuous images that are still images; and
the image processing apparatus according to claim 1, to perform image processing on the continuous images captured by the imaging unit.

* * * * *